(12) United States Patent
Nakamura et al.

(10) Patent No.: US 8,376,875 B2
(45) Date of Patent: *Feb. 19, 2013

(54) GOLF CLUB SHAFT AND GOLF CLUB USING THE SAME

(75) Inventors: Masaki Nakamura, Fukushima (JP); Masaki Wakabayashi, Fukushima (JP)

(73) Assignee: Fujikura Rubber Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,839

(22) Filed: May 16, 2012

(65) Prior Publication Data

US 2012/0225732 A1 Sep. 6, 2012

Related U.S. Application Data

(63) Continuation of application No. 12/566,830, filed on Sep. 25, 2009, now Pat. No. 8,262,500.

(30) Foreign Application Priority Data

Sep. 26, 2008 (JP) ................................ 2008-247378

(51) Int. Cl.
*A63B 53/10* (2006.01)
(52) U.S. Cl. ....................................................... 473/319
(58) Field of Classification Search ........... 473/316–323
See application file for complete search history.

(56) References Cited

U.S. PATENT DOCUMENTS

| 5,156,396 | A | * | 10/1992 | Akatsuka et al. | ............. | 473/319 |
| 5,599,612 | A | * | 2/1997 | Muraki et al. | .................. | 442/60 |
| 5,984,804 | A | * | 11/1999 | Berg | .............................. | 473/319 |
| 6,270,426 | B1 | * | 8/2001 | Matsumoto | ................... | 473/319 |
| 2002/0103040 | A1 | * | 8/2002 | Ashida | .......................... | 473/319 |

FOREIGN PATENT DOCUMENTS

| JP | H04-120769 | 10/1992 |
| JP | 2000-014843 | 1/2000 |
| JP | 2000-245880 | 9/2000 |
| JP | 2000-288139 | 10/2000 |
| JP | 2002177424 A * | 6/2002 |
| JP | 2006-000620 | 1/2006 |
| JP | 2006-061473 | 3/2006 |
| WO | 2005/065785 | 7/2005 |

* cited by examiner

*Primary Examiner* — Stephen L. Blau
(74) *Attorney, Agent, or Firm* — McCormick, Paulding & Huber LLP

(57) ABSTRACT

A golf club shaft formed by winding prepregs made of uncured thermosetting resin into a tapered shape and curing the prepregs thermally, the prepregs include a first woven fabric prepreg which is made of one of a triaxial woven fabric or a tetra-axial woven fabric that are impregnated with uncured thermosetting resin, and a second woven fabric prepreg which is made of one of a triaxial woven fabric or a tetra-axial woven fabric that are impregnated with uncured thermosetting resin.

4 Claims, 15 Drawing Sheets

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 13 | 1 | 1 | Triaxes | |
| 51 | 1 | 1 | 0 | |
| 71 | 1 | 1 | Tetra-axes | |
| 15 | 1 | 1 | 0 | |
| 16 | 2 | 2 | 0 | |
| 17 | / | / | 0 | |

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 13 | 1 | 1 | Triaxes | |
| 14 | 1 | 1 | Triaxes | |
| 15 | 1 | 1 | 0 | |
| 16 | 2 | 2 | 0 | |
| 17 | / | / | 0 | |

Lengthwise Direction of Shaft

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 21 | 1 | 1 | Tetra-axes | |
| 22 | 1 | 1 | Tetra-axes | |
| 15 | 1 | 1 | 0 | |
| 16 | 2 | 2 | 0 | |
| 17 | / | / | 0 | |

Lengthwise Direction of Shaft

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 41 | 1 | 1 | Tetra-axes | |
| 14 | 1 | 1 | Triaxes | |
| 15 | 1 | 1 | 0 | |
| 16 | 2 | 2 | 0 | |
| 17 | / | / | 0 | |

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 13 | 1 | 1 | Triaxes | |
| 51 | 1 | 1 | 0 | |
| 14 | 1 | 1 | Triaxes | |
| 15 | 1 | 1 | 0 | |
| 16 | 2 | 2 | 0 | |
| 17 | / | / | 0 | |

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 61 | 1 | 1 | Tetra-axes | |
| 51 | 1 | 1 | 0 | |
| 62 | 1 | 1 | Tetra-axes | |
| 15 | 1 | 1 | 0 | |
| 16 | 2 | 2 | 0 | |
| 17 | / | / | 0 | |

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 111 | 1 | 1 | Triaxes | |
| 102 | 1 | 1 | 0 | |
| 15 | 1 | 1 | 0 | |
| 16 | 2 | 2 | 0 | |
| 17 | / | / | 0 | |

| Prepreg | No. of Turns at Distal-End | No. of Turns at Proximal-End | Angle (°) | Prepreg Shape |
|---|---|---|---|---|
| 11 | 3 | 3 | 45 | |
| 12 | 3 | 3 | 45 | |
| 121 | 1 | 1 | Tetra-axes | |
| 102 | 1 | 1 | 0 | |
| 15 | 1 | 1 | 0 | |
| 16 | 2 | 2 | 0 | |
| 17 | / | / | 0 | |

GOLF CLUB SHAFT AND GOLF CLUB USING THE SAME

CROSS REFERENCE TO RELATED APPLICATION

This application is a continuation of U.S. patent application Ser. No. 12/566,830 filed on Sep. 25, 2009, which claims priority of the following co-pending application, namely, Japanese Patent Application No. 2008-247378 filed on Sep. 26, 2008.

BACKGROUND OF THE INVENTION

1. Field of the Invention

The present invention relates to a golf club shaft and a golf club using this golf club shaft.

2. Description of the Prior Art

Golf club shafts (hereinafter also referred to simply as "shafts") made of FRP (fiber reinforced plastics) are known in the art. The FRP shaft is formed into a tapered shaft by winding a plurality of prepregs, which are made of carbon fiber impregnated with uncured thermosetting resin, on a mandrel in the shape of a tapered shaft and thermally curing the plurality of prepregs wound on the mandrel. Although such a plurality of prepregs are conventionally used as a combination mainly of the following different types prepregs: a UD (unidirectional) prepreg(s) (prepreg whose unwoven fibers are all bundled and extended in a single direction), a straight layer(s) whose long fibers are parallel to the longitudinal direction of the shaft, a bias layer(s) whose long fibers are angled relative to the longitudinal direction of the shaft at a predetermined angle, and a hoop layer(s) whose long fibers are angled relative to the longitudinal direction of the shaft at an angle of 90 degrees, shafts including prepregs made of woven fabric composites have become more common in recent years.

The assignee of the present invention has proposed a shaft including a tetra-axis woven fabric prepreg (see Japanese Unexamined Patent Publication No. 2000-245880) and another shaft including a biaxial woven fabric prepreg (plain weave fabric prepreg) and a triaxial woven fabric prepreg (see Japanese Unexamined Patent Publication No. 2006-61473) as shafts that include prepregs made of woven fabric composites.

However, in the shafts disclosed in the above-mentioned Japanese Unexamined Patent Publication No. 2000-245880 and 2006-61473, no consideration has been made from the viewpoint of the vibration damping performance of the shaft. "Vibration damping performance" is one of the indicators showing the ability to damp (attenuate) vibrations of the shaft. Specifically, the higher the vibration damping performance, the less vibrations caused when the club head impacts a golf ball are transmitted to the player, and the lower the vibration damping performance, the easier vibrations caused when the club head impacts a golf ball are transmitted to the player. If the golf player continues to use the shaft whose vibration damping performance is low for years, the burden on the golf player's body increases, which could be a cause of injury to the golf player. Therefore, the vibration damping performance is an important factor which may improve or deteriorate the performance of the shaft. However, not much research and development having its main focus on the vibration damping performance thereof have been carried out on shafts in the past. Specifically, not much research and development that pay attention to the effect on the shaft vibration damping performance due to lamination of textile materials have been carried out on shafts.

On the other hand, due to the tendency toward weight reduction of the shaft in recent years, although the weight of woven fabric prepregs exerts an influence on the sense of use to the golf player at a level of several to over ten grams (per unit of area) and imposes restrictions on shaft design, a biaxial woven fabric prepreg is high in density due to the structure thereof, thus unavoidably becoming at least approximately 170 grams per square meters (300 grams per square meters in the case of a heavy biaxial woven fabric prepreg). Namely, using a biaxial woven fabric prepreg in itself in a similar manner to the shaft disclosed in Japanese Unexamined Patent Publication No. 2006-61473 has given rise to less design flexibility from the viewpoint of the weight of the shaft using woven fabric prepregs.

In short, in conventional shafts, there have been certain limits to development of a shaft having both a high vibration damping performance and design flexibility from the viewpoint of the shaft weight in line with the stream of weight reduction.

SUMMARY OF THE INVENTION

The present invention has been devised in view of the above described problems and provides a golf club shaft in which the vibration damping performance can be improved and in which design flexibility from the viewpoint of the shaft weight is high.

According to an aspect of the invention, a golf club shaft is provided, formed by winding a plurality of prepregs made of uncured thermosetting resin into a tapered shape and curing the prepregs thermally, the prepregs including a first woven fabric prepreg which is made of one of a triaxial woven fabric or a tetra-axial woven fabric that is impregnated with uncured thermosetting resin, and a second woven fabric prepreg which is made of one of a triaxial woven fabric or a tetra-axial woven fabric that is impregnated with uncured thermosetting resin.

Accordingly, each of the first woven fabric prepreg and the second woven fabric prepreg can be a triaxial woven fabric prepreg, each of the first woven fabric prepreg and the second woven fabric prepreg can be a tetra-axial woven fabric prepreg, the first woven fabric prepreg can be a triaxial woven fabric prepreg and the second woven fabric prepreg can be a tetra-axial woven fabric prepreg wound on the first woven fabric prepreg, or the first woven fabric prepreg can be a tetra-axial woven fabric prepreg and the second woven fabric prepreg can be a triaxial woven fabric prepreg wound on the first woven fabric prepreg.

It is desirable for each of the number of turns of the first woven fabric prepreg and the number of turns of the second woven fabric prepreg to be one across the shaft.

It is desirable for the golf club shaft to include an intermediate prepreg interposed between the first woven fabric prepreg and the second woven fabric prepreg. The intermediate prepreg is made of a 0-degree layer, a long fiber direction of which is parallel to an longitudinal direction of the golf club shaft.

It is desirable for the weight of each of the first woven fabric prepreg and the second woven fabric prepreg to be in a range between 40 g/m² and 150 g/m².

It is desirable for the golf club shaft to include at least two bias prepregs layered and wound into a tapered shape, the first woven fabric prepreg and the second woven fabric prepreg being wound around the at least two bias prepregs.

It is desirable for the golf club shaft to include at least two 0-degree prepregs layered and wound around the first woven fabric prepreg and the second woven fabric prepreg.

It is desirable for a golf club to be provided with the golf club shaft above the above construction, to which a golf club head and a grip are fixed.

According to the present invention, a golf club shaft is achieved in which the vibration damping rate can be improved and in which design flexibility from the viewpoint of the shaft weight is high.

BRIEF DESCRIPTION OF THE DRAWINGS

The present invention will be discussed below in detail with reference to the accompanying drawings, in which.

DESCRIPTION OF THE PREFERRED EMBODIMENTS

As a result of zealous research, the inventors of the present invention have found that the vibration damping performance of the shaft can be dramatically improved by using two woven fabric prepregs, each of which is either a triaxial or tetra-axial woven fabric prepreg (woven fabric prepreg), in the structures of the prepregs of the shaft. Moreover, the inventors of the present invention have proven performance advantages of the shaft according to the present invention by actually making shafts with the above described structures and numerically converting the vibration damping performance of each shaft into a "vibration damping rate" (vibration damping ratio) to quantitatively evaluate the numbers thus converted.

[First Embodiment]

Figure 1:
FIG. 1 is a schematic diagram illustrating the structures of the prepregs of a first embodiment of a golf club shaft according to the present invention.

FIG. 1 is a diagram illustrating the structures of prepregs of a first embodiment of a golf club shaft 10 according to the present invention. In the table shown in FIG. 1, "No. of Turns at Distal End" and "No. of Turns at Proximal End" represent the number of turns of the prepreg on the small-diameter distal end and the large-diameter proximal end thereof, respectively. Additionally, "Angle" represents the angle of the fabric fibers contained in the prepreg relative to the longitudinal direction of the shaft (in the case of 0-degree prepreg, bias prepreg or triangular prepreg), or shows whether the prepreg is a triaxial woven fabric prepreg or a tetra-angular woven fabric prepreg.

The shaft 10 is formed into a tapered shape, and the diameter of the shaft 10 gradually increases in the direction from the small-diameter distal end toward the large-diameter proximal end. A club head (not shown) is fixed to the small-diameter distal-end of the shaft 10, while a grip (not shown) is fixed to the large-diameter proximal end (butt end) of the shaft 10.

The shaft 10 is provided with two bias prepregs 11 and 12, two triaxial woven fabric prepregs 13 and 14, two 0-degree prepregs 15 and 16 and a triangular prepreg 17 that are all wound on a tapered mandrel 1, in that order from under layer. Each of the two bias prepregs 11 and 12 is wound three turns. Each of the two triaxial woven fabric prepregs 13 and 14 is wound one turn. The 0-degree prepreg 15 is wound one turn and the 0-degree prepreg 16 is wound two turns. The two bias prepregs 11 and 12 and the two 0-degree prepregs 15 and 16 are mutually identical in material. However, the two bias prepregs 11 and 12 and the two 0-degree prepregs 15 and 16 are mutually different in orientation (long fiber direction); the long fiber direction of each bias prepreg 11 and 12 is angled at 45 degrees relative to the longitudinal direction (axial direction) of the shaft 10, whereas the long fiber direction of each 0-degree prepreg 15 and 16 is parallel (in a developed view) to the axis of the shaft 10. All the prepregs except the triangular prepreg 17 are full-length layers, each of which is formed into a trapezoidal shape which tapers in a direction toward the small-diameter end (leftward with respect to FIG. 1) from the large-diameter end so that the number of turns becomes the same across the full length when wound on the mandrel 1. The prepregs 11 through 17 wound on the mandrel 1 are each heated to cure the uncured thermosetting resin contained therein, thereby forming the golf club shaft 10.

The woven fabric layer in each of the two bias prepregs 11 and 12 is a ±45-degree, layer the long fiber direction of which is angled at ±45 degrees relative to the longitudinal direction of the shaft 10. Each of the woven fabric layers in the two 0-degree prepregs 15 and 16 and the triangular prepreg 17 is a 0-degree layer, the long fiber direction of which is parallel (in a developed view) to the axis of the shaft 10. The triangular prepreg 17 is used to make the distal-end portion of the shaft 10 into a straight portion corresponding to the hosel diameter of the golf club head.

The triaxial woven fabric prepreg 13 constituting a first woven fabric prepreg and the triaxial woven fabric prepreg 14 constituting a second woven fabric prepreg are sheet prepregs, each of which is made of a triaxial woven fabric impregnated with uncured thermosetting resin. The material of this triaxial woven fabric can be selected from among various materials such as carbon fiber, alumina fiber, aramid fiber, carbon silicate fiber and amorphous fiber. The thermosetting resin with which the triaxial woven fabric is impregnated can be selected from among various resins such as epoxy resin, unsaturated polyester resin, phenolic resin and vinylester resin.

Figure 2:
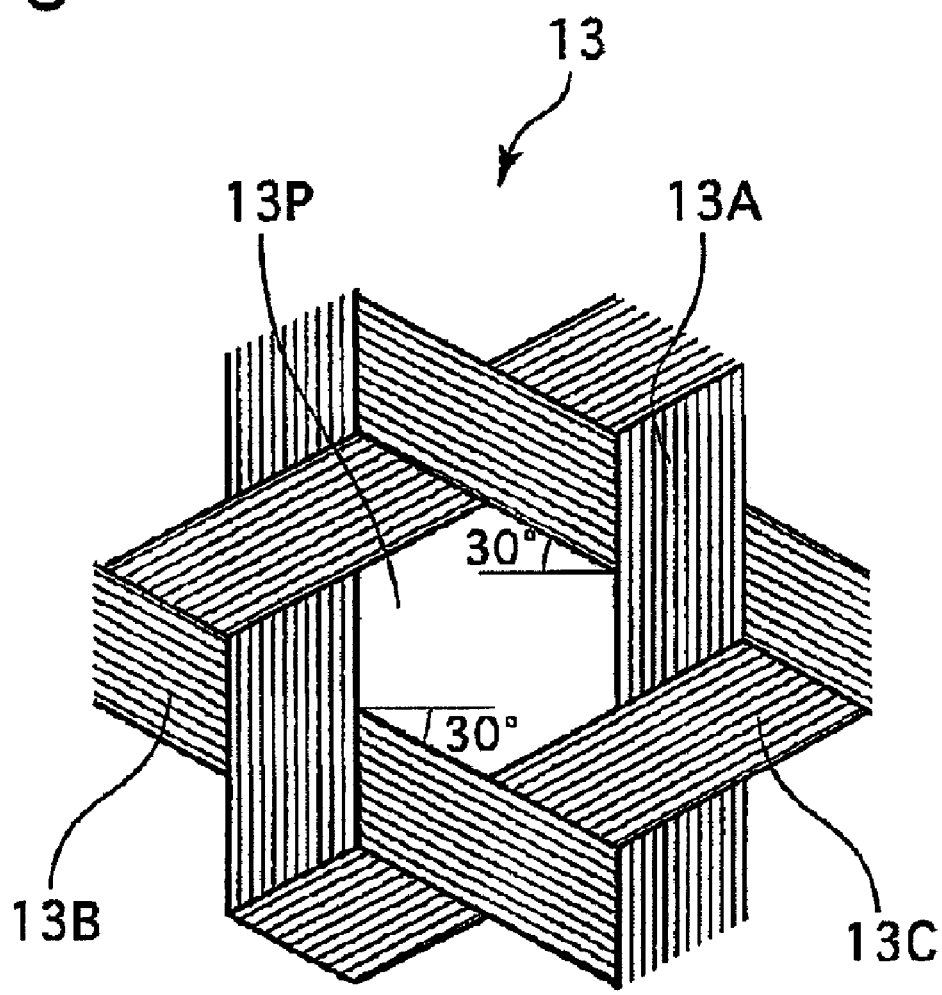
FIG. 2 is a diagram showing the woven fabric structure of each triaxial woven fabric prepreg shown in FIG. 1.

The structures of the triaxial woven fabric prepregs 13 and 14 will be further discussed hereinafter with reference to FIG. 2. The two triaxial woven fabric prepregs 13 and 14 are mutually identical in structure.

The triaxial woven fabric prepreg 13 is provided with weft (a set of weft threads) 13A, warp (a set of warp threads) 13B and another warp (a set of warp threads) 13C. The weft threads 13A extend perpendicularly to the longitudinal direction of the shaft 10. The two sets of warp threads 13B and 13C extend obliquely to the weft threads 13A so as to intersect therewith at symmetrical angles (e.g., +30 degrees and −30 degrees) with respect to the weft threads 13A, respectively. The woven fabric structure of the triaxial woven fabric prepreg 13 is such that the weft threads 13A are laced over and under the warp threads 13B and 13C alternately. The weft threads 13A and the warp threads 13B and 13C are woven so as to form hexagonal void spaces 13P between textures thereof. The triaxial woven fabric prepreg 13 is made by impregnating such a triaxial woven fabric with uncured thermosetting resin. The intersecting angle between the weft threads 13A and the warp threads 13B and 13C is not limited to any particular angle.

Specifically, TABLE 1 below shows elastic modulus, thickness, resin content and weight of each prepreg of the shaft 10 shown in FIG. 1. The resin content (%) represents the percentage of the resin weight relative to the weight of the entire prepreg.

TABLE 1

| Prepreg | Elastic Modulus (tonf/mm$^2$) | Thickness (mm) | Resin Content (%) | Weight (g/m$^2$) |
|---|---|---|---|---|
| 11 | 30.0 | 0.08 | 24.0 | 132 |
| 12 | 30.0 | 0.08 | 24.0 | 132 |
| 13 | 23.5 | 0.20 | 40.0 | 122 |
| 14 | 23.5 | 0.20 | 40.0 | 122 |
| 15 | 30.0 | 0.08 | 24.0 | 132 |
| 16 | 30.0 | 0.08 | 24.0 | 132 |
| 17 | 23.5 | 0.08 | 24.0 | 132 |

The weight of each of the triaxial woven fabric prepregs 13 and 14 illustrated in the first embodiment is 122 g/m$^2$. However, this weight can be greater than or equal to 40 g/m$^2$ and less than or equal to 150 g/m$^2$, more desirably greater than or equal to 70 g/m$^2$ and less than or equal to 130 g/m$^2$. To ensure a favorable (desirable) sense of use to the user and stability of formation of the shaft, it is desirable that the weight of each triaxial woven fabric prepreg 13 and 14 be greater than or equal to 40 g/m$^2$.

The biaxial woven fabric prepreg is high in density due to the structure thereof as described above, thus being heavier than each triaxial woven fabric prepreg 13 and 14. The weight of the biaxial woven fabric prepreg is at least approximately 170 g/m$^2$ (300 g/m$^2$ in the case of a heavy biaxial woven fabric prepreg). In the recent trend with weight reduction of the shaft, the weight of the shaft is desperately reduced down to a level of several grams to a few dozen grams (per unit of area); however, such a difference in weight between the biaxial woven fabric prepreg and the triaxial woven fabric prepreg (greater than or equal to 30 g/m$^2$ per sheet) becomes a fetter to shaft design from the viewpoint of shaft weight.

In that respect, the structure of the shaft 10 that uses the two triaxial woven fabric prepregs 13 and 14 with no use of any biaxial woven fabric prepreg can enhance design flexibility from the viewpoint of shaft weight.

In addition, the above described structure in which the two triaxial woven fabric prepregs 13 and 14 are wound as full-length layers makes it possible to improve the vibration damping performance of the shaft 10. Data showing improvements in the vibration damping performance of the shaft 10 will be discussed later.

[Second Embodiment]

Figure 3:
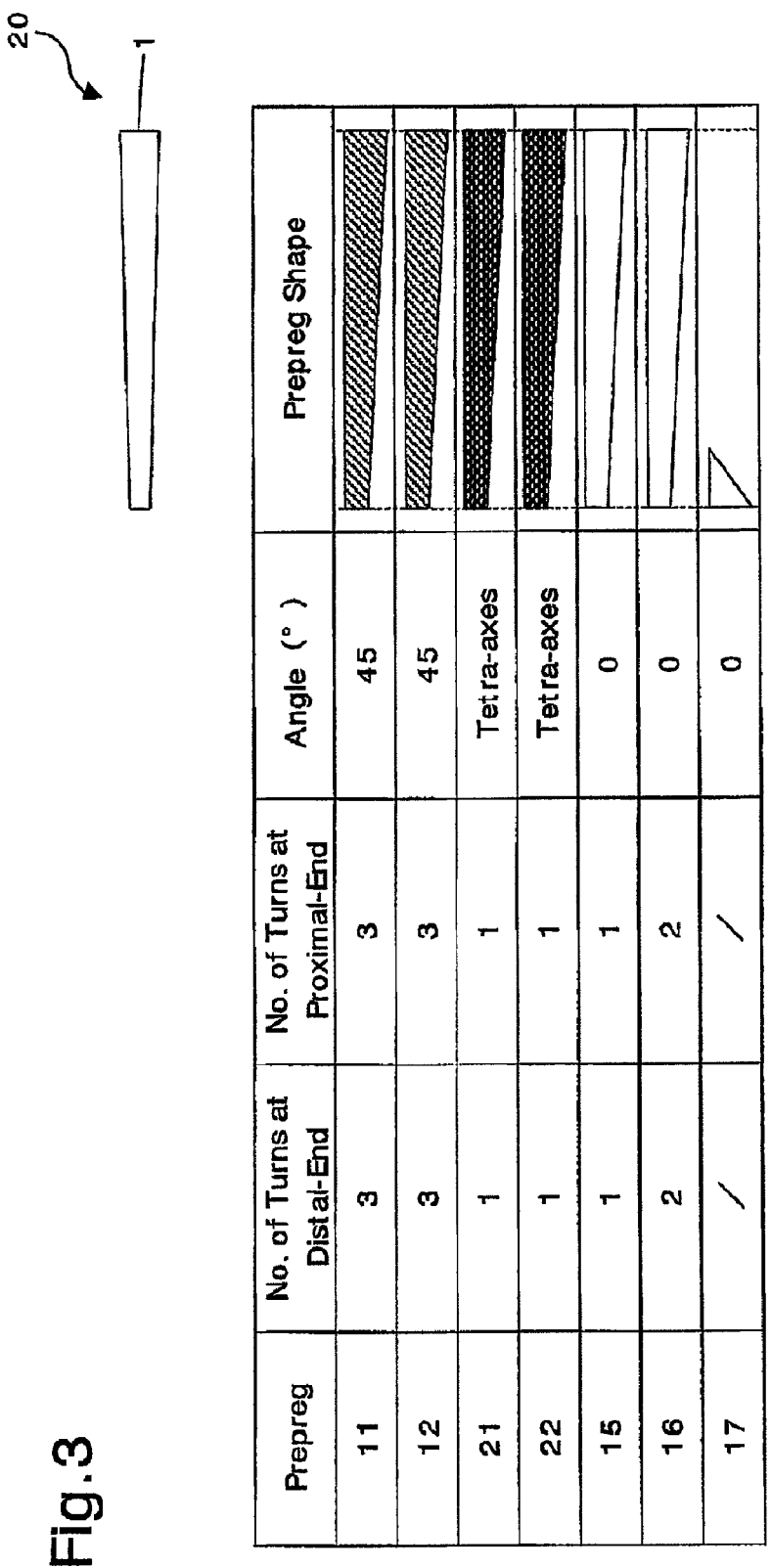
FIG. 3 is a schematic diagram illustrating the structures of the prepregs of a second embodiment of the golf club shaft according to the present invention.

FIG. 3 is a diagram illustrating the structures of the prepregs of a second embodiment of a golf club shaft 20 according to the present invention.

The shaft 20 is identical in structure to the first embodiment of the shaft 10 except that two tetra-axial woven fabric prepregs 21 and 22 instead of the two triaxial woven fabric prepregs 13 and 14 of the shaft 10 are wound on the bias prepreg 12. Except this structural difference, the second embodiment of the golf club shaft 20 is identical to the first embodiment of the golf club shaft 10, so that elements of the shaft 20 which are identical to those of the shaft 10 are designated by the same reference numerals, and detailed descriptions of such identical elements are omitted from the following description.

The tetra-axial woven fabric prepreg 21 constituting a first woven fabric prepreg and the tetra-axial woven fabric prepreg 22 constituting a second woven fabric prepreg are sheet prepregs, each of which is made of a tetra-axial woven fabric impregnated with uncured thermosetting resin. Like each of the above described two triaxial woven fabric prepregs 13 and 14, the material of this tetra-axial woven fabric can be selected from among various materials.

Figure 4:
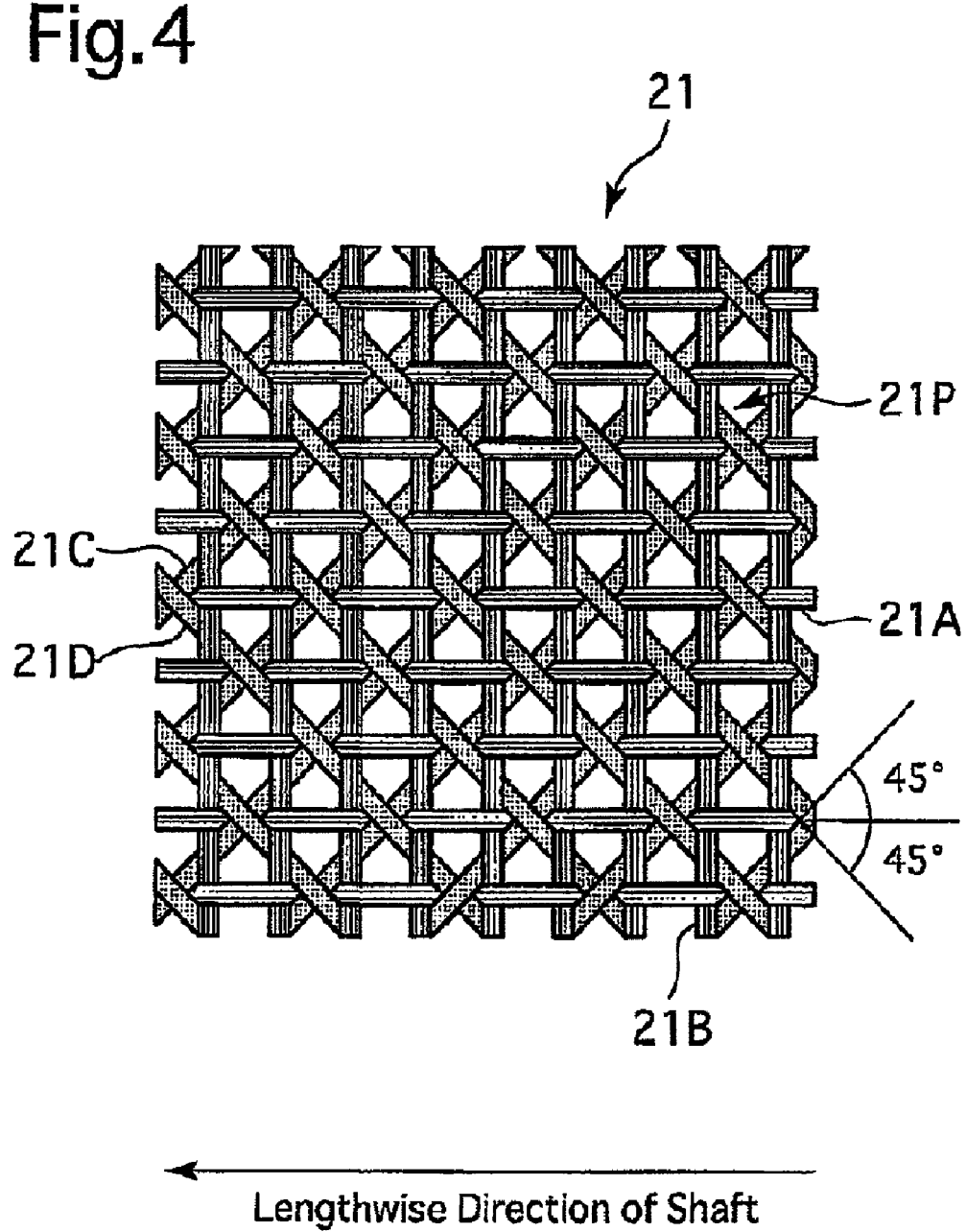
FIG. 4 is a diagram showing the woven fabric structure of each tetra-axial woven fabric prepreg shown in FIG. 3.

The structures of the tetra-axial woven fabric prepregs 21 and 22 will be further discussed hereinafter with reference to FIG. 4. The two tetra-axial woven fabric prepregs 21 and 22 are mutually identical in structure.

The tetra-axial woven fabric prepreg 21 is provided with a set of vertical axis threads 21A, a set of lateral axis threads 21B, and two sets of oblique axis threads 21C and 21D. The vertical axis threads 21A extend parallel to the longitudinal direction of the shaft 20. The lateral axis threads 21B extend perpendicularly to the vertical axis threads 21A. Each set of the oblique axis threads 21C and 21D extends obliquely to both the vertical axis threads 21A and the lateral axis threads 21B so as to intersect therewith at symmetrical angles (e.g., +45 degrees and −45 degrees) with respect to the vertical axis threads 21A and the lateral axis threads 21B. The woven fabric structure of the tetra-axial woven fabric prepreg 21 is such that the vertical axis threads 21A, the lateral axis threads 21B, the oblique axis threads 21C and the oblique axis threads 21D are mutually laced over and under one another. The vertical axis threads 21A, the lateral axis threads 21B, the oblique axis threads 21C and the oblique axis threads 21D are woven so as to form pentagonal (home-base shaped) void spaces 21P therebetween. The tetra-axial woven fabric prepreg 21 is made by impregnating such a tetra-axial woven fabric with uncured thermosetting resin. The intersecting angle between the vertical axis threads 21A (the lateral axis threads 21B) and the oblique axis threads 21C (the oblique axis threads 21D) is not limited to any particular angle.

Specifically, TABLE 2 below shows elastic modulus, thickness, resin content and weight of each of the two triaxial woven fabric prepregs 21 and 22 of the shaft 20 shown in FIG. 3.

TABLE 2

| Prepreg | Elastic Modulus (tonf/mm$^2$) | Thickness (mm) | Resin Content (%) | Weight (g/m$^2$) |
|---|---|---|---|---|
| 21 | 24.0 | 0.20 | 49.0 | 100 |
| 22 | 24.0 | 0.20 | 49.0 | 100 |

The weight of each of the tetra-axial woven fabric prepregs 21 and 22 illustrated in the second embodiment is 100 g/m$^2$. However, this weight can be greater than or equal to 40 g/m$^2$ or less than or equal to 150 g/m$^2$, more desirably greater than or equal to 70 g/m$^2$ or less than or equal to 130 g/m$^2$. To ensure a favorable (desirable) sense of use to the user and the stability of formation of the shaft, it is desirable that the weight of each tetra-axial woven fabric prepreg 21 and 22 be greater than or equal to 40 g/m$^2$.

As described above in the description of the first embodiment, according also to the structure of the second embodiment of the shaft that uses the two tetra-axial woven fabric prepregs 21 and 22 with no use of any biaxial woven fabric prepreg (which is so heavy that it becomes a fetter to shaft design from the viewpoint of shaft weight), design flexibility from the viewpoint of shaft weight can be enhanced. In addition, this structure is superior also from the viewpoint of improvement in vibration damping performance of the shaft 20.

[Third Embodiment]

Figure 5:
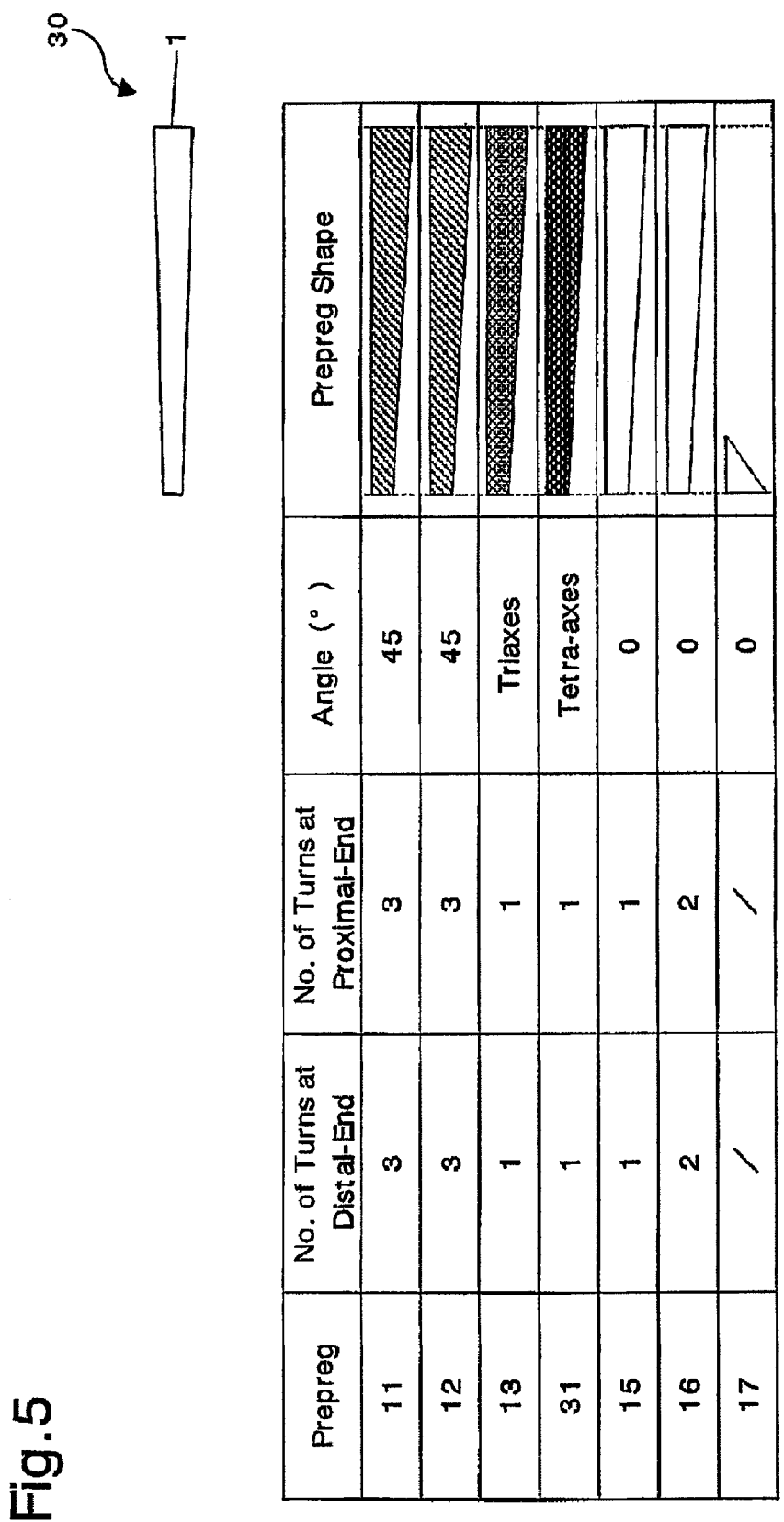
FIG. 5 is a schematic diagram illustrating the structures of the prepregs of a third embodiment of the golf club shaft according to the present invention.

FIG. 5 is a diagram illustrating the structures of the prepregs of a third embodiment of a golf club shaft 30 according to the present invention.

The shaft 30 is identical in structure to the first embodiment of the shaft 10 except that a tetra-axial woven fabric prepreg 31 instead of the triaxial woven fabric prepreg 14 of the shaft 10 is wound on the triaxial woven fabric prepreg 13. In other words, in the shaft 30, the triaxial woven fabric prepreg 13 and the tetra-axial woven fabric prepreg 31 are layered and wound in that order from the inside of the shaft 30. Since the tetra-axial woven fabric prepreg 31 is identical in structure to each of the tetra-axial woven fabric prepregs 21 and 22, a detailed description of the tetra-axial woven fabric prepreg 31 is omitted from the following description. The other elements of the shaft 30 are also identical in structure to those of the shaft 10, thus designated by the same reference numerals, and detailed descriptions of such identical elements are omitted from the following description.

Similar to the above described first and second embodiments, the structure of the shaft 30 that uses one triaxial woven fabric prepreg and one tetra-axial woven fabric prepreg also makes it possible to enhance design flexibility of the shaft from the viewpoint of shaft weight and also makes it possible to improve the vibration damping performance of the shaft.

[Fourth Embodiment]

Figure 6:
FIG. 6 is a schematic diagram illustrating the structures of the prepregs of a fourth embodiment of the golf club shaft according to the present invention.

FIG. 6 is a diagram illustrating the structures of the prepregs of a fourth embodiment of a golf club shaft 40 according to the present invention.

The shaft 40 is identical in structure to the first embodiment of the shaft 10 except that a tetra-axial woven fabric prepreg 41 instead of the triaxial woven fabric prepreg 13 of the shaft 10 is wound on the bias prepreg 12. In other words, in the shaft 40, the tetra-axial woven fabric prepreg 41 and the triaxial woven fabric prepreg 14 are layered and wound in that order from the inside of the shaft 40. Since the tetra-axial woven fabric prepreg 41 is identical in structure to each of the tetra-axial woven fabric prepregs 21 and 22, a detailed description of the tetra-axial woven fabric prepreg 41 is omitted from the following description. The other elements of the shaft 40 are also identical in structure to those of the shaft 10, thus designated by the same reference numerals, and detailed descriptions of such identical elements are omitted from the following description.

Similar to the above described first through third embodiments, the structure of the shaft 40 that uses one tetra-axial woven fabric prepreg and one triaxial woven fabric prepreg also makes it possible to enhance design flexibility of the shaft from the viewpoint of shaft weight and also makes it possible to improve the vibration damping performance of the shaft.

[Fifth Embodiment]

Figure 7:
FIG. 7 is a schematic diagram illustrating the structures of the prepregs of a fifth embodiment of the golf club shaft according to the present invention.

FIG. 7 is a diagram illustrating the structures of the prepregs of a fifth embodiment of a golf club shaft 50 according to the present invention.

The shaft 50 is identical in structure to the first embodiment of the shaft 10 except that the shaft 50 is further provided between the two triaxial woven fabric prepregs 13 and 14 with an intermediate prepreg 51. The other elements of the shaft 50 are identical in structure to those of the shaft 10, thus designated by the same reference numerals, and detailed descriptions of such identical elements are omitted from the following description.

The intermediate prepreg 51 is a 0-degree layer, the long fiber direction thereof being parallel (in a developed view) to the longitudinal direction of the shaft 50. The intermediate prepreg 51 is formed into a trapezoidal shape which tapers in a direction toward the small-diameter end side from the large-diameter end side so as to be wound one turn across the full length when wound around the mandrel 1.

Specifically, TABLE 3 below shows elastic modulus, thickness, resin content and weight of the intermediate prepreg 51 of the shaft 50 shown in FIG. 7.

TABLE 3

| Prepreg | Elastic Modulus (tonf/mm$^2$) | Thickness (mm) | Resin Content (%) | Weight (g/m$^2$) |
|---|---|---|---|---|
| 51 | 23.5 | 0.06 | 24.0 | 99 |

The intermediate prepreg 51 further improves the vibration damping performance of the shaft 50 in collaboration with the two triaxial woven fabric prepregs 13 and 14 that are wound immediately inside and outside the intermediate prepreg 51, respectively. Each of the two triaxial woven fabric prepregs 13 and 14 is made by weaving three fiber threads extending in three directions, thus being softer than a 0-degree layer in the bending direction (0-degree direction) of the shaft 50. By winding the intermediate prepreg 51, the fiber threads of which being bundled and extended in the bending direction (0-degree direction) of the shaft 50, between the two soft triaxial woven fabric prepregs 13 and 14 in this manner, the vibration damping performance of the woven fabric is displayed more clearly, which damps excessive transmission of vibrations, thus making it possible to improve golf swing stability. Data showing further improvements in the vibration damping performance of the shaft 50, in which the intermediate prepreg 51 is interposed between two woven fabric prepreg layers, will be discussed later.

In addition, the intermediate prepreg 51 enhances the stability of formation of the shaft 50. Since the void spaces 13P are formed between textures of fiber threads in each of the two triaxial woven fabric prepregs 13 and 14 (see FIG. 2), the contact area therebetween when wound around the mandrel 1 will be smaller than that in the case of adopting a woven fabric prepreg with no such void spaces. In contrast, the interposition of the intermediate prepreg 51 between the two triaxial woven fabric prepregs 13 and 14 makes it possible to secure a satisfactory contact area between each triaxial woven fabric prepreg 13 and 14 and the intermediate prepreg 51 even with the presence of the void spaces 13 since the two triaxial woven fabric prepregs 13 and 14 adhere tightly to the intermediate prepreg 51 from inside and outside thereof, thus making it possible to enhance the stability of formation of the shaft 50.

In this manner, providing the intermediate prepreg 51 makes it possible to achieve a further improvement in vibration damping performance of the shaft 50 and to enhance the stability of formation thereof.

[Sixth Embodiment]

Figure 8:
FIG. 8 is a schematic diagram illustrating the structures of the prepregs of a sixth embodiment of the golf club shaft according to the present invention.

FIG. 8 is a diagram illustrating the structures of the prepregs of a sixth embodiment of a golf club shaft 60 according to the present invention.

The shaft 60 is identical in structure to the fifth embodiment of the shaft 50 except that two tetra-axial woven fabric prepregs 61 and 62 instead of the two triaxial woven fabric prepregs 13 and 14 are wound on the bias prepreg 12 with the intermediate prepreg 51 interposed between the two tetra-axial woven fabric prepregs 61 and 62 in the shaft 60. Since the two tetra-axial woven fabric prepregs 61 and 62 are identical in structure to the tetra-axial woven fabric prepregs 21 and 22, detailed descriptions of the two tetra-axial woven fabric prepregs 61 and 62 are omitted from the following description. The other elements of the shaft 60 are also identical in structure to those of the shaft 50, thus designated by the same reference numerals, and detailed descriptions of such identical elements are omitted from the following description.

Similar to the fifth embodiment, the structure of the shaft 60 in which the intermediate prepreg 51 is interposed between the two tetra-axial woven fabric prepregs 61 and 62 also makes it possible to further improve the vibration damping performance of the shaft and to enhance the stability of formation of the shaft.

[Seventh Embodiment]

Figure 9:
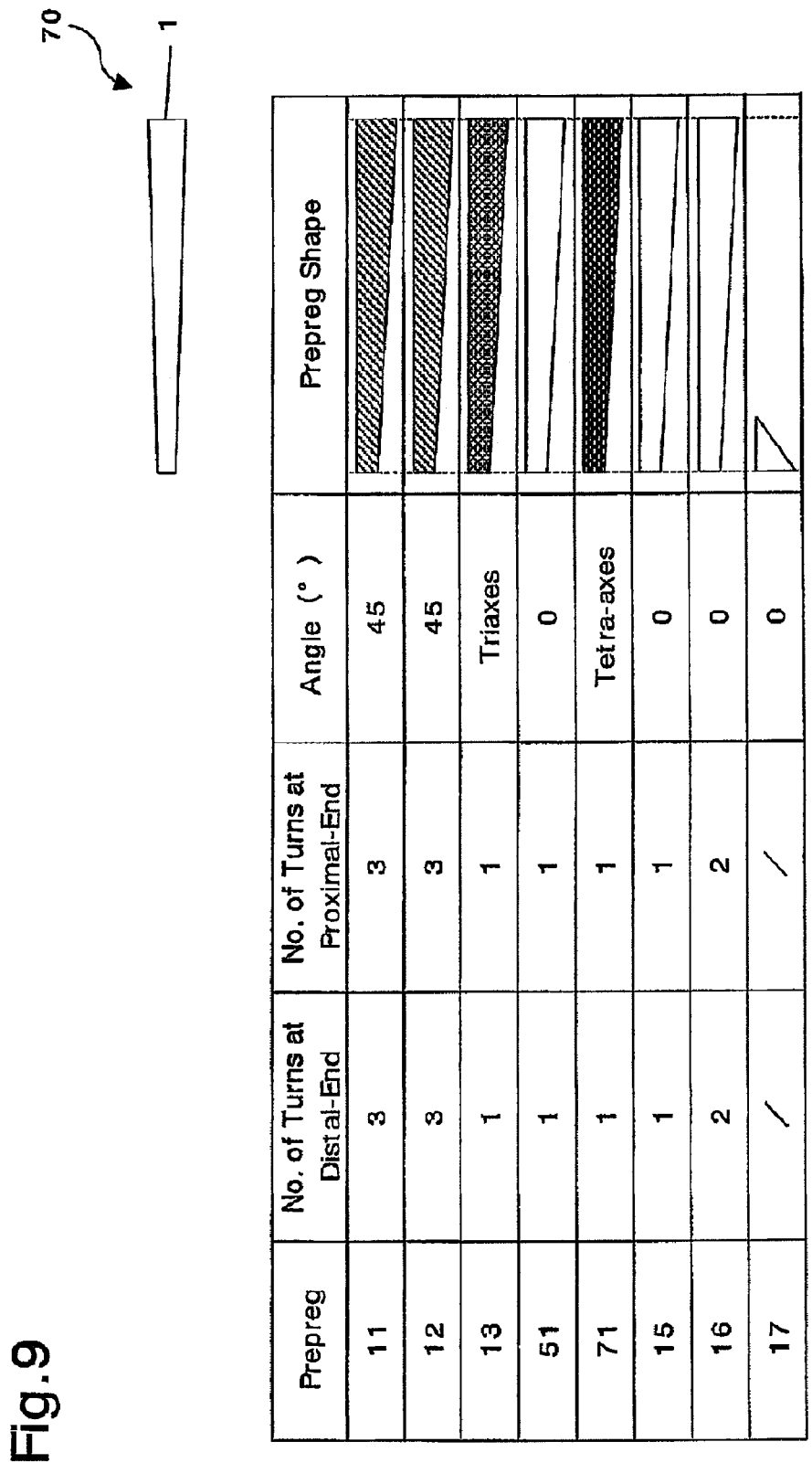
FIG. 9 is a schematic diagram illustrating the structures of the prepregs of a seventh embodiment of the golf club shaft according to the present invention.

FIG. 9 is a diagram illustrating the structures of the prepregs of a seventh embodiment of a golf club shaft 70 according to the present invention.

The shaft 70 is identical in structure to the fifth embodiment of the shaft 50 except that a tetra-axial woven fabric prepreg 71 instead of the triaxial woven fabric prepreg 14 of the shaft 50 is wound on the intermediate prepreg 51 in the shaft 70. In other words, in the shaft 70, the triaxial woven fabric prepreg 13, the intermediate prepreg 51 and the tetra-axial woven fabric prepreg 71 are layered and wound in that order from the inside of the shaft 70. Since the tetra-axial woven fabric prepreg 71 is identical in structure to each of the tetra-axial woven fabric prepregs 21 and 22, a detailed description of the tetra-axial woven fabric prepreg 71 is omitted from the following description. The other elements of the shaft 70 are also identical in structure to those of the shaft 50, thus designated by the same reference numerals, and detailed descriptions of such identical elements are omitted.

Similar to the fifth and sixth embodiments, the structure of the shaft 70 in which the intermediate prepreg 51 is interposed between the triaxial woven fabric prepreg 13 and the tetra-axial woven fabric prepreg 71 also makes it possible to further improve the vibration damping performance of the shaft and to enhance the stability of formation of the shaft.

[Eighth Embodiment]

Figure 10:
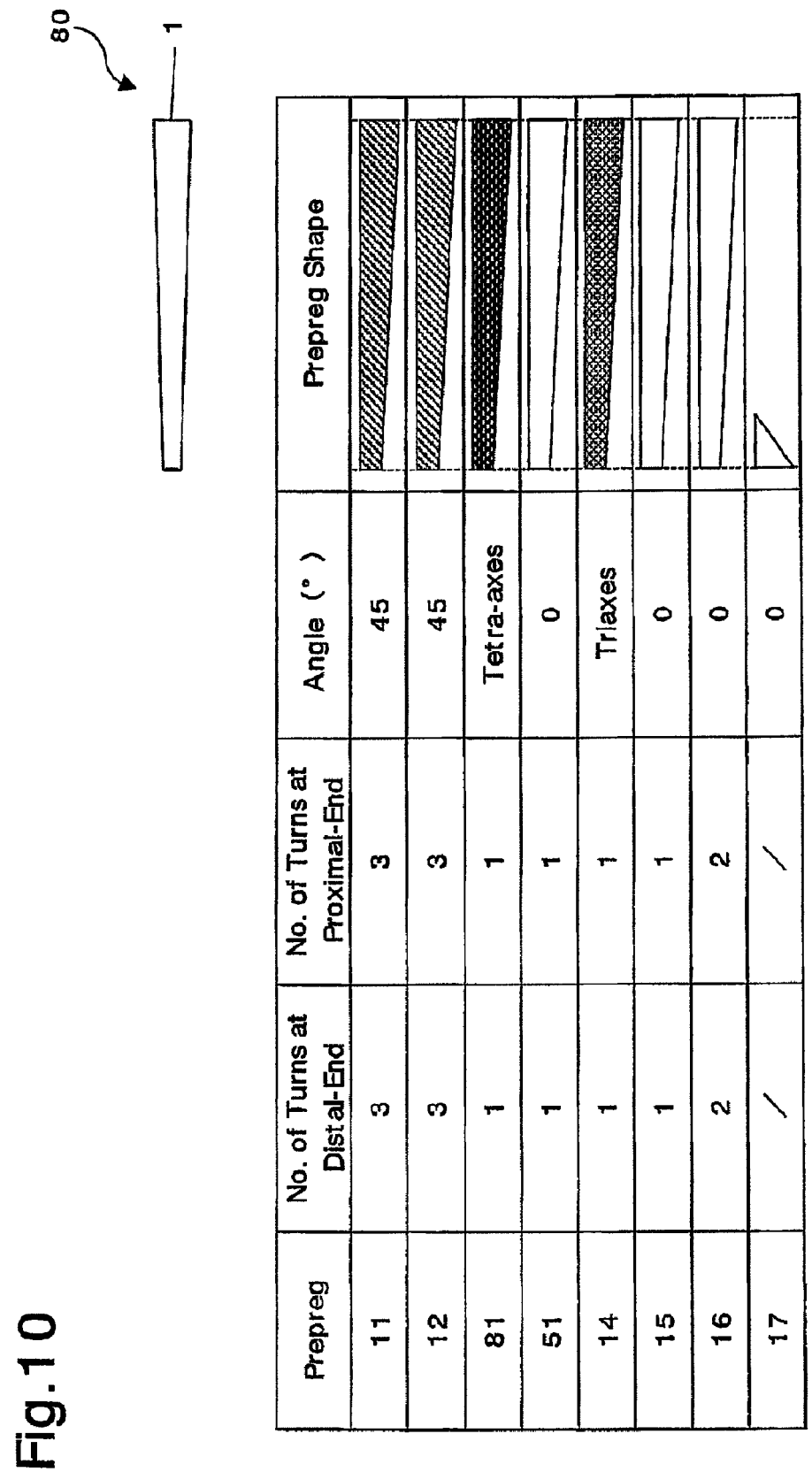
FIG. 10 is a schematic diagram illustrating the structures of the prepregs of an eighth embodiment of the golf club shaft according to the present invention.

FIG. 10 is a diagram illustrating the structures of the prepregs of an eighth embodiment of a golf club shaft 80 according to the present invention.

The shaft 80 is identical in structure to the fifth embodiment of the shaft 50 except that a tetra-axial woven fabric prepreg 81 instead of the triaxial woven fabric prepreg 13 of the shaft 50 is wound on the bias prepreg 12 in the shaft 80. In other words, in the shaft 80, the tetra-axial woven fabric prepreg 81, the intermediate prepreg 51 and the triaxial woven fabric prepreg 14 are layered and wound in that order from the inside of the shaft 80. Since the tetra-axial woven fabric prepreg 81 is identical in structure to each of the tetra-axial woven fabric prepregs 21 and 22, a detailed description of the tetra-axial woven fabric prepreg 81 is omitted from the following description. The other elements of the shaft 80 are also identical in structure to those of the shaft 50, thus designated by the same reference numerals, and detailed descriptions of such identical elements are omitted.

Similar to the fifth to seventh embodiments, the structure of the shaft 80 in which the intermediate prepreg 51 is interposed between the tetra-axial woven fabric prepreg 81 and the triaxial woven fabric prepreg 14 also makes it possible to further improve the vibration damping performance of the shaft and to enhance the stability of formation of the shaft.

Although two woven fabric prepregs, each of which is either a triaxial or tetra-axial woven fabric prepreg, are used as full-length layers in each of the above described embodiments, it is possible that one triaxial or tetra-axial woven fabric prepreg and another triaxial or tetra-axial woven fabric prepreg be used as a full-length layer and a partial layer, respectively, or that two woven fabric prepregs, each of which is either a triaxial or tetra-axial woven fabric prepreg, are used as partial layers.

Although the number of turns (number of plies) of each triaxial or tetra-axial woven fabric prepreg is one in each of the above described embodiments, the present invention is not limited by this particular number of turns. For instance, the number of turns of each triaxial or tetra-axial woven fabric prepreg can be two or three according to shaft design.

The prepreg structure of the shaft is not limited solely to the above described embodiments of the shafts, and various modifications can be applied to the prepreg structure of the shaft. For instance, as an example of a shaft reinforcing layer, a distal-end reinforcing layer for reinforcing the distal-end portion of the shaft can be added between the 0-degree prepreg 16 and the triangular prepreg 17. In addition, a prepreg (hoop layer) whose long fibers are angled at an angle of 90 degrees relative to the lengthwise direction of the shaft 10 can be wound between the prepregs 11 through 17. Additionally, the number of turns of each prepreg is not limited to a specific number, and the number of turns of each prepreg on the small-diameter distal end and the number of turns of the prepreg on the large-diameter proximal end do not have to be the same.

EXAMPLES

Figure 11:
FIG. 11 is a schematic diagram illustrating the structures of the prepregs of a comparative example of a golf club shaft.
Figure 12:
FIG. 12 is a schematic diagram illustrating the structures of the prepregs of another comparative example of a golf club shaft.
Figure 13:
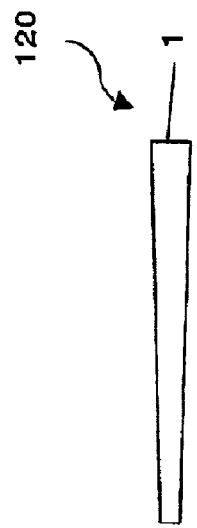
FIG. 13 is a schematic diagram illustrating the structures of the prepregs of yet another comparative example of a golf club shaft.

The inventors of the present invention actually produced the above described first through third embodiments of the shafts 10, 20 and 30, the above described fifth through seventh embodiments of the shafts 50, 60 and 70, and three comparative examples of shafts 100, 110 and 120. The shaft 100 is identical in structure to the first embodiment of the shaft 10 except that two 0-degree prepregs 101 and 102 (0°+0°) instead of the two triaxial woven fabric prepregs 13 and 14 of the shaft 10 are wound on the bias prepreg 12 in the shaft 100 (see FIG. 11). The shaft 110 is identical in structure to the comparative example of the shaft 100 except that a triaxial woven fabric prepreg 111 instead of the 0-degree prepreg 101 is wound on the bias prepreg 12 in the shaft 110 (see FIG. 12). The shaft 120 is identical in structure to the comparative example of the shaft 100 except that a tetra-axial woven fabric prepreg 121 instead of the 0-degree prepreg 101 is wound on the bias prepreg 12 in the shaft 120 (see FIG. 13). TABLE 4 below shows elastic modulus, thickness, resin content and weight of each the 0-degree prepregs 101 and 102 shown in FIGS. 11 through 13.

TABLE 4

| Prepreg | Elastic Modulus (tonf/mm$^2$) | Thickness (mm) | Resin Content (%) | Weight (g/m$^2$) |
|---|---|---|---|---|
| 101 | 23.5 | 0.06 | 24.0 | 99 |
| 102 | 23.5 | 0.06 | 24.0 | 99 |

The inventors of the present invention quantitatively evaluated the vibration damping performance of each of the produced nine shafts 100, 110, 120, 10, 20, 30, 50, 60 and 70 by converting the vibration damping performances of the produced nine shafts 100, 110, 120, 10, 20, 30, 50, 60 and 70 into numbers following measurement of the vibration damping rates thereof. To make this evaluation, two shafts were produced for each of the nine shafts 100, 110, 120, 10, 20, 30, 50, 60 and 70, and the vibration damping rate was measured five times on each of the two shafts (i.e., ten times in total).

The vibration damping rates were measured according to the following procedural steps:

1. Fixing the large-diameter end of the shaft to a jig to hang the shaft therefrom.
2. Applying impact to the hanging shaft with a hammer.
3. Measuring an oscillatory wave form in the process of damping with a laser displacement meter installed at the small-diameter end of the shaft.
4. Conducting frequency analysis on the measured oscillatory wave form with an FFT (Fast Fourier Transformation) analyzer to obtain an oscillatory wave form caused by vibrations of the shaft.
5. Calculating a logarithmic decrement ζ with FORMULA 1 below using an amplitude peak value $x_1$ and another peak value $x_{n+1}$ in a periodic wave of the obtained oscillatory wave form. In this measurement test, n is set at 20 (n=20).

$$\zeta = \frac{1}{2n\pi} \log\left(\frac{x_1}{x_{n+1}}\right) \quad \text{[FORMULA 1]}$$

Figure 14:
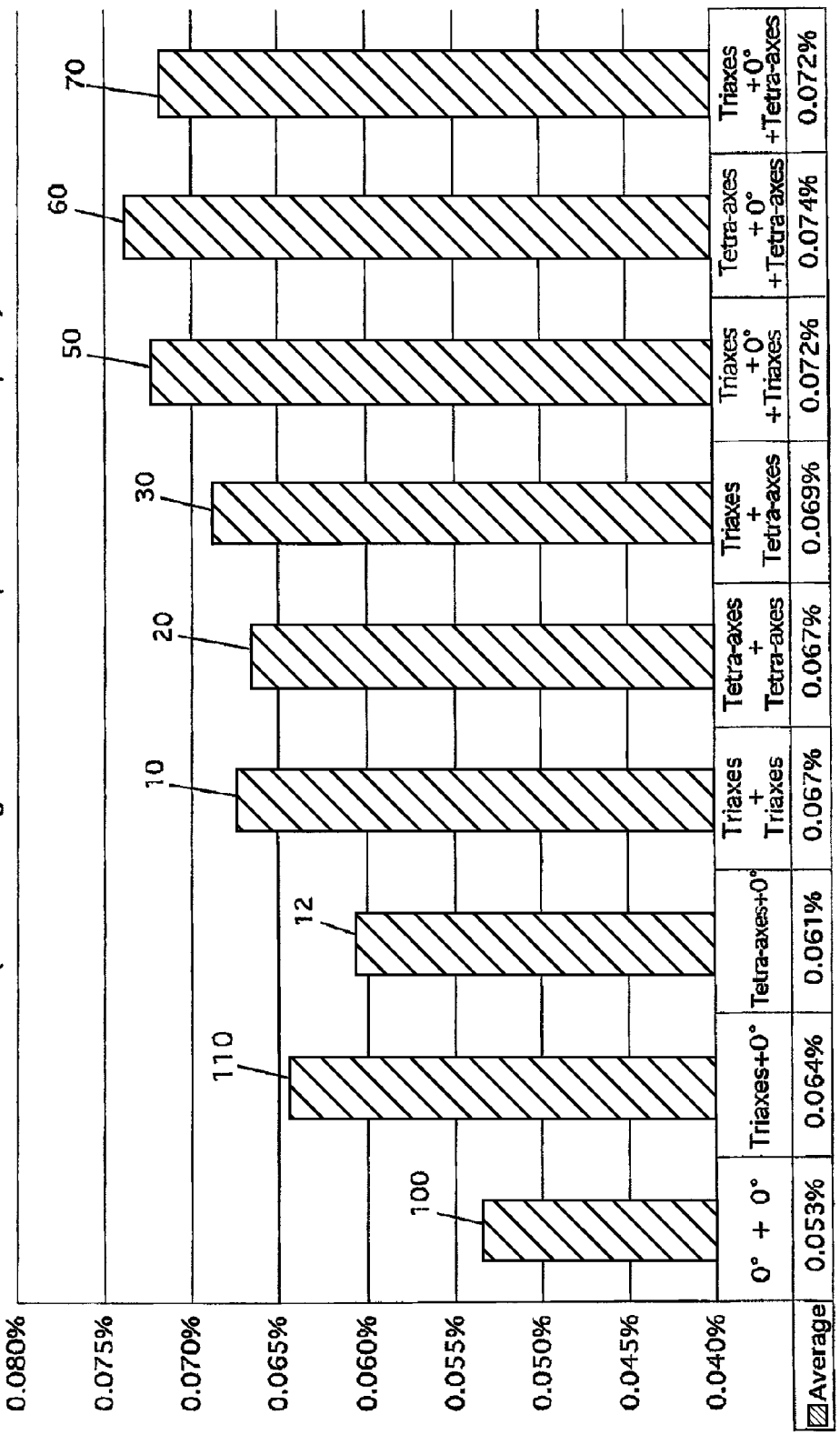
FIG. 14 is a first bar graph showing the measurement results of the vibration damping rates of the first, second, third, fifth, sixth and seventh embodiments of the golf club shafts shown in FIGS. 1, 2, 4, 7, 8 and 9 and the three comparative examples of golf club shafts shown in FIGS. 11 through 13, illustrating the superior vibration damping performance of the present embodiments of the golf club shafts.

FIG. 14 is a bar graph showing the measurement results of the vibration damping rates of the nine shafts 100, 110, 120, 10, 20, 30, 50, 60 and 70. FIG. 14 shows the average value of the measured vibration damping rate over ten attempts on each shaft.

It can be understood from the graph shown in FIG. 14 that each of the shafts 10, 20 and 30, in which two woven fabric prepregs each of which is either a triaxial or tetra-axial woven fabric prepreg are overlaid and wound around the mandrel 1, displays a higher vibration damping rate than any of the three comparative examples of shafts: the shaft 100, which does not include any triaxial or tetra-axial woven fabric prepreg, and the two shafts 110 and 120, each of which includes only one triaxial or tetra-axial woven fabric prepreg. For instance, in the graph shown in FIG. 14, the vibration damping rate of the shaft 30 (triaxes+tetra-axes) is 0.069 (%), showing an approximately 130% increase relative to the vibration damping rate (0.053%) of the shaft 100 (0°+0°) and an approximately 113% increase relative to the vibration damping rate (0.061%) of the shaft 120 (tetra-axes+0°).

Additionally, each of the shafts 50, 60 and 70, in which the intermediate prepreg (0-degree prepreg) 51 is interposed between two prepregs, each of which is either a triaxial or tetra-axial woven fabric prepreg, displays a much higher vibration damping rate. For instance, in the graph shown in FIG. 14, the vibration damping rate of the shaft 60 (tetra-axes+0°+tetra-axes) is 0.074 (%), showing an approximately 140% increase relative to the vibration damping rate (0.053%) of the shaft 100 (0°+0°), an approximately 121% increase relative to the vibration damping rate (0.061%) of the shaft 120 (tetra-axes+0°), and an approximately 110% increase relative to the vibration damping rate (0.067%) of the shaft 20 (tetra-axes+tetra-axes).

Figure 15:
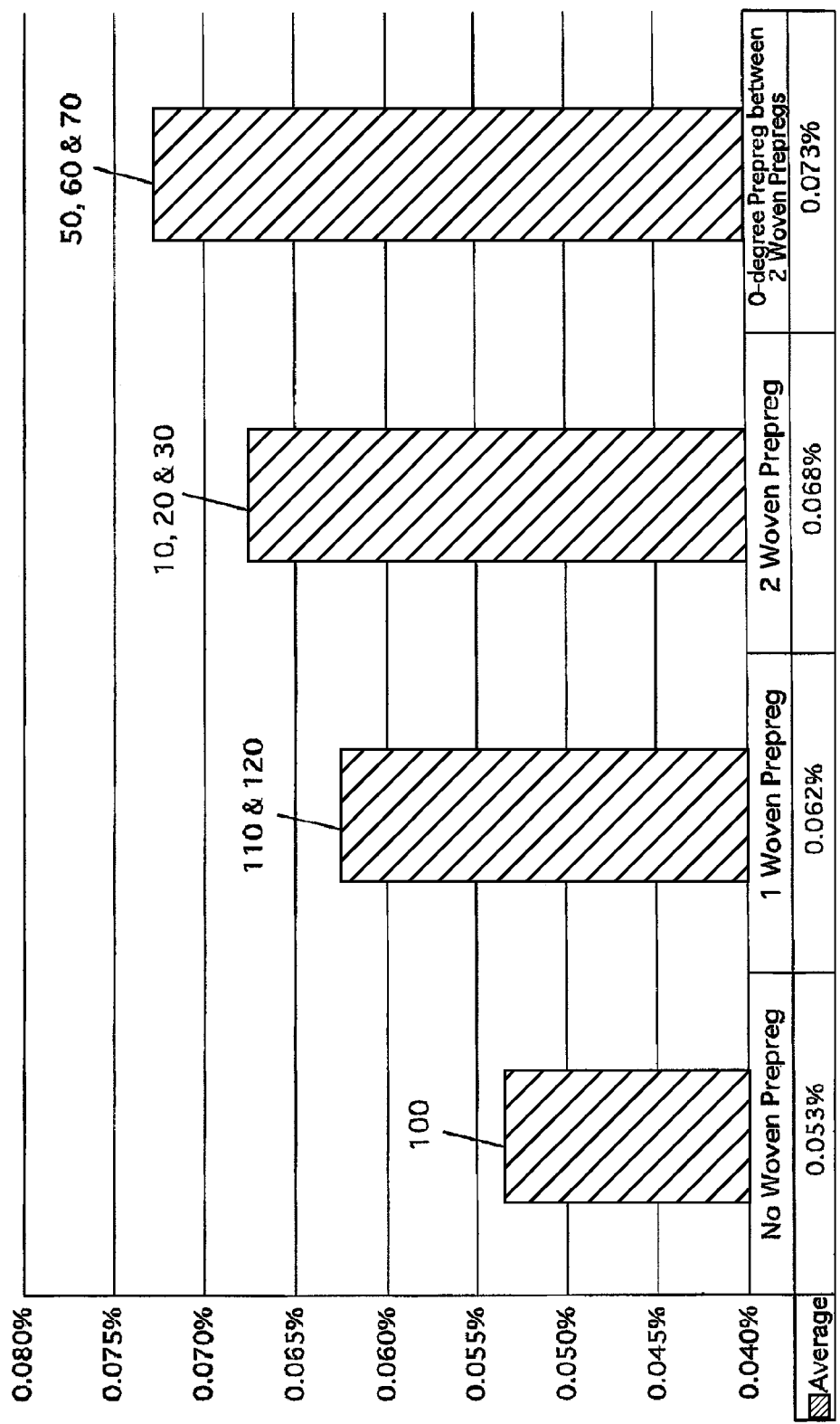
FIG. 15 is a second bar graph made from the measurement results shown in FIG. 14, illustrating the superior vibration damping performance of the present embodiments of the golf club shafts.

FIG. 15 is a bar graph showing the vibration damping rate of the shaft 100, the average value between the vibration damping rates of the shafts 110 and 120, the average value between the vibration damping rates of the shafts 10, 20 and 30, and the average value between the vibration damping rates of the shafts 50, 60 and 70, showing a comparison therebetween.

In the graph shown in FIG. 15, the average of the vibration damping rates of the shafts 10, 20 and 30, in which two woven fabric prepregs each of which is either a triaxial or tetra-axial woven fabric prepreg are overlaid and wound around the mandrel 1, is 0.0068 (%), showing an approximately 128% increase relative to the vibration damping rate (0.053%) of the shaft 100, which does not include any triaxial or tetra-axial woven fabric prepreg, and an approximately 110% increase relative to the average of the vibration damping rates (0.062%) of the shafts 110 and 120, each of which includes only one triaxial or tetra-axial woven fabric prepreg.

Additionally, the average of the vibration damping rates of the shafts 50, 60 and 70, in which the intermediate prepreg (0-degree prepreg) 51 is interposed between two prepregs, each of which is either a triaxial or tetra-axial woven fabric prepreg, is 0.073 (%), showing an approximately 138% increase relative to the vibration damping rate (0.053%) of the shaft 100, which does not include any triaxial or tetra-axial woven fabric prepreg, an approximately 118% increase relative to the average of the vibration damping rates (0.062%) of the shafts 110 and 120, each of which includes only one triaxial or tetra-axial woven fabric prepreg, and an approximately 107% increase relative to the average of the vibration damping rates (0.068%) of the shafts 10, 20 and 30, in which two woven fabric prepregs each of which is either a triaxial or tetra-axial woven fabric prepreg are overlaid and wound around the mandrel 1.

The aforementioned increases in vibration damping rate each displays an improvement in vibration damping performance of the shaft, which alleviates the burden on the golf player when the club head impacts a golf ball, thus reducing deleterious effects on the golf play to thereby make it possible for the golf player to perform smooth golf swings consecutively.

In addition, the design flexibility of each shaft 10 through 80 from the viewpoint of the weight of the shaft is high since each shaft 10 through 80 does not use any biaxial woven fabric prepreg. Therefore, the golf club shaft according to the present invention has a structure making it possible to achieve both an improvement in vibration damping performance and an improvement in design flexibility of the shaft from the viewpoint of shaft weight.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A golf club shaft formed by winding a plurality of prepregs made of uncured thermosetting resin into a tapered shape and curing said prepregs thermally, said prepregs comprising:
    a first woven fabric prepreg that is impregnated with uncured thermosetting resin;
    a second woven fabric prepreg that is impregnated with uncured thermosetting resin; and
    an intermediate prepreg interposed between said first woven fabric prepreg and said second woven fabric prepreg with said first and second woven fabric prepregs wound immediately inside and outside said intermediate prepreg,
    wherein one of said first woven fabric prepreg and said second woven fabric prepreg is made of a tetra-axial woven fabric, and the other is made of a tri-axial woven fabric,
    wherein said intermediate prepreg is made of a 0-degree layer, a long fiber direction of which is parallel to an longitudinal direction of said golf club shaft.

2. The golf club shaft according to claim 1, wherein each of the number of turns of the first woven fabric prepreg and the number of turns of said second woven fabric prepreg is one.

3. The golf club shaft according to claim 1, wherein the weight of each of said first woven fabric prepreg and said second woven fabric prepreg is in a range between 40 g/m2 and 150 g/m2.

4. A golf club comprising said golf club shaft according to claim 1, to which a golf club head and a grip are fixed.

* * * * *